US012508893B2

(12) United States Patent
Takami et al.

(10) Patent No.: US 12,508,893 B2
(45) Date of Patent: Dec. 30, 2025

(54) INDUSTRIAL HYBRID ENGINE

(71) Applicant: KUBOTA Corporation, Osaka (JP)

(72) Inventors: Masayasu Takami, Sakai (JP); Kentaro Kita, Sakai (JP); Kazuaki Koyama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 504 days.

(21) Appl. No.: 17/923,427

(22) PCT Filed: Oct. 25, 2021

(86) PCT No.: PCT/JP2021/039247
§ 371 (c)(1),
(2) Date: Nov. 4, 2022

(87) PCT Pub. No.: WO2022/137774
PCT Pub. Date: Jun. 30, 2022

(65) Prior Publication Data
US 2023/0191891 A1 Jun. 22, 2023

(30) Foreign Application Priority Data
Dec. 25, 2020 (JP) .................................. 2020-217112

(51) Int. Cl.
*B60K 6/40* (2007.10)
*F16H 7/12* (2006.01)
*F16H 7/08* (2006.01)

(52) U.S. Cl.
CPC ............. *B60K 6/40* (2013.01); *F16H 7/1281* (2013.01); *B60Y 2200/92* (2013.01);
(Continued)

(58) Field of Classification Search
CPC ........... B60K 6/26; B60K 6/40; F16H 7/1281; F16H 2007/0842; F16H 2007/0844
See application file for complete search history.

(56) References Cited

U.S. PATENT DOCUMENTS 7,717,080 B1 * 5/2010 Grozich ................ F16H 7/1281
248/220.21
10,161,374 B2 * 12/2018 Serkh ...................... F02N 11/04
(Continued)

FOREIGN PATENT DOCUMENTS

DE 102014115044 A1 4/2016
EP 1529957 A1 5/2005
(Continued)

OTHER PUBLICATIONS

International Search Report issued Dec. 28, 2021 in PCT/JP2021/039247.
Extended European Search Report issued on Nov. 11, 2024, in EP Application No. 21909931.4.

*Primary Examiner* — Jeffrey J Restifo
(74) *Attorney, Agent, or Firm* — Panitch Schwarze Belisario & Nadel LLP

(57) ABSTRACT

Based on further ingenuity, it is possible to support a heavy and large electric motor on an engine body with sufficient strength while driving the electric motor with a belt without slipping, thereby providing a more streamlined industrial hybrid engine. The industrial hybrid engine is provided with an endless rotation band wound around a drive pulley of a crankshaft and a motor pulley of an electric motor for motive power. The electric motor is attached to an engine case in a position-fixed state using one support bracket. The support bracket includes first and second support portions for attaching the electric motor, and attachment portions positioned between the first and second support portions for attaching the electric motor to the engine case.

16 Claims, 13 Drawing Sheets

(52) U.S. Cl.
CPC ............... *F16H 2007/0804* (2013.01); *F16H 2007/0842* (2013.01); *F16H 2007/0865* (2013.01); *F16H 2007/0874* (2013.01); *F16H 2007/0893* (2013.01); *F16H 2007/0897* (2013.01)

(56) References Cited

U.S. PATENT DOCUMENTS

| | | | | |
|---|---|---|---|---|
| 11,047,454 | B2* | 6/2021 | Fukada | ............... F16H 7/02 |
| 11,548,370 | B2* | 1/2023 | Takami | ............... B60L 50/16 |
| 2017/0234214 | A1* | 8/2017 | Laimboeck | ............ F02B 75/20 |
| | | | | 123/59.6 |
| 2018/0195483 | A1* | 7/2018 | Serkh | ............... F16H 7/1281 |
| 2019/0001806 | A1* | 1/2019 | Takami | ............... B60L 50/16 |
| 2023/0111557 | A1* | 4/2023 | Naganawa | ............... F16H 7/12 |
| | | | | 474/110 |
| 2023/0191891 | A1* | 6/2023 | Takami | ............... B60K 6/48 |

FOREIGN PATENT DOCUMENTS

| | | |
|---|---|---|
| EP | 1321646 B1 | 8/2007 |
| JP | 2005-288074 A | 10/2005 |
| JP | 2012225264 A | 11/2012 |
| JP | 2015-182512 A | 10/2015 |
| JP | 2016-107787 A | 6/2016 |
| JP | 2020-504264 A | 2/2020 |
| JP | 2020-106013 A | 7/2020 |

\* cited by examiner (A)

(B)

(A)

Left                Right (B)

Rear                Front (A)

(B)

INDUSTRIAL HYBRID ENGINE

CROSS-REFERENCE TO RELATED APPLICATIONS

This application is a Section 371 of International Application No. PCT/JP2021/039247, filed Oct. 25, 2021, which was published in the Japanese language on Jun. 30, 2022, under International Publication No. WO 2022/137774 A1, which claims priority under 35 U.S.C. § 119(b) to Japanese Application No. 2020-217112, filed Dec. 25, 2020, the disclosures of each of which are incorporated herein by reference.

TECHNICAL FIELD

The present invention relates to an industrial hybrid engine such as a hybrid tractor engine and a construction machine engine.

BACKGROUND ART

An engine disclosed in Patent Document 1 is known as this type of industrial hybrid engine, an electric motor for driving is supported on an engine body in a position-fixed manner, and a dedicated tensioner for belt tension is provided.

In the engine of Patent Document 1, the electric motor is disposed on a right side with respect to a crankshaft when facing the engine, but in the present development engine, a structure in which an alternator is originally disposed on a left side with respect to the crankshaft when facing the engine (for example, Patent Document 2) is a basis. Therefore, it is difficult to refer to the prior art described above (Patent Document 1 or the like), and it is necessary to consider a new arrangement layout.

However, when a heavy and large driving electric motor is disposed on the right side of the engine, the structure disclosed in Patent Literature 2, that is, the structure in which a lower portion of the motor is bolted and an upper portion is supported by one plate-shaped stay has a problem with strength and the like, and there is room for improvement in support strength of the electric motor and belt transmission force of the electric motor with respect to a motor pulley.

PRIOR ART DOCUMENTS

Patent Documents

Patent Document 1: Japanese Patent Application Laid-open No. 2015-182512
Patent Document 2: Japanese Patent Application Laid-open No. 2020-106013

SUMMARY OF THE INVENTION

Problems to be Solved by the Invention

An object of the present invention is to provide a more streamlined industrial hybrid engine in which a heavy and large electric motor can be supported on an engine body with sufficient strength while being belt-driven without slipping based on further ingenuity.

Solutions to the Problems

According to the present invention, in an industrial hybrid engine, an endless rotation band wound around a drive pulley of a crankshaft and a motor pulley of an electric motor for motive power is provided, and the electric motor is attached to an engine case in a position-fixed state using one support bracket.

The support bracket advantageously includes first and second support portions for attaching the electric motor, and an attachment portion positioned between the first and second support portions for attaching the electric motor to the engine case. More advantageously, the first support portion protrudes obliquely upward from the attachment portion to bolt the upper portion of the electric motor, and the second support portion protrudes obliquely downward from the attachment portion to bolt the lower portion of the electric motor.

With regard to the present invention, for characteristic configurations and means other than configurations (means) described above, please refer to claims 4 to 10.

Effects of the Invention

According to the present invention, since the electric motor is attached to the engine case in a positionally fixed manner using one support bracket, the electric motor can be fixedly supported with sufficient strength even at a position relatively away to the side of the engine case. Since the support bracket is a dedicated component, even a heavy and large electric motor can be supported by the engine case with sufficient strength and rigidity.

In this case, when the support bracket includes the first and second support portions for attaching the electric motor, and the attachment portion positioned between the first and second support portions for attaching the electric motor to the engine case, the support bracket with the electric motor can be attached to the engine case in a well-balanced manner by the attachment portion positioned between the two support portions while the large-diameter electric motor is firmly supported by the two support portions.

As a result, the heavy and large electric motor can be sufficiently supported by the engine body while being belt-driven without slipping, and a more streamlined industrial hybrid engine can be provided.

BRIEF DESCRIPTION OF THE DRAWINGS

FIG. 1(A) is a front view and FIG. 1(B) is a plan view.
FIG. 2(A) is a right side view and FIG. 2(B) is a rear view.
FIG. 4(A) is a rear view,
and FIG. 4(B) is a right side view.
FIG. 5(A) is a front view and FIG. 5(B) is a plan view.

FIG. 11(A) is a plan view of a main part, and FIG. 11(B) is a front view of the main part.

FIG. 12(A) is a plan view, and FIG. 12(B) is a front view.

EMBODIMENTS OF THE INVENTION

Hereinafter, a case where one embodiment of the industrial hybrid engine according to the present invention is applied to a diesel engine applied to a forklift, a tractor, or the like, will be described with reference to the drawings. In an industrial hybrid engine E, a side with a transmission belt 9 is defined as front, a side with a flywheel housing 16 is defined as rear, a side with an exhaust manifold 10 is defined as left, and a side with an intake manifold 13 is defined as right.

Figure 7:
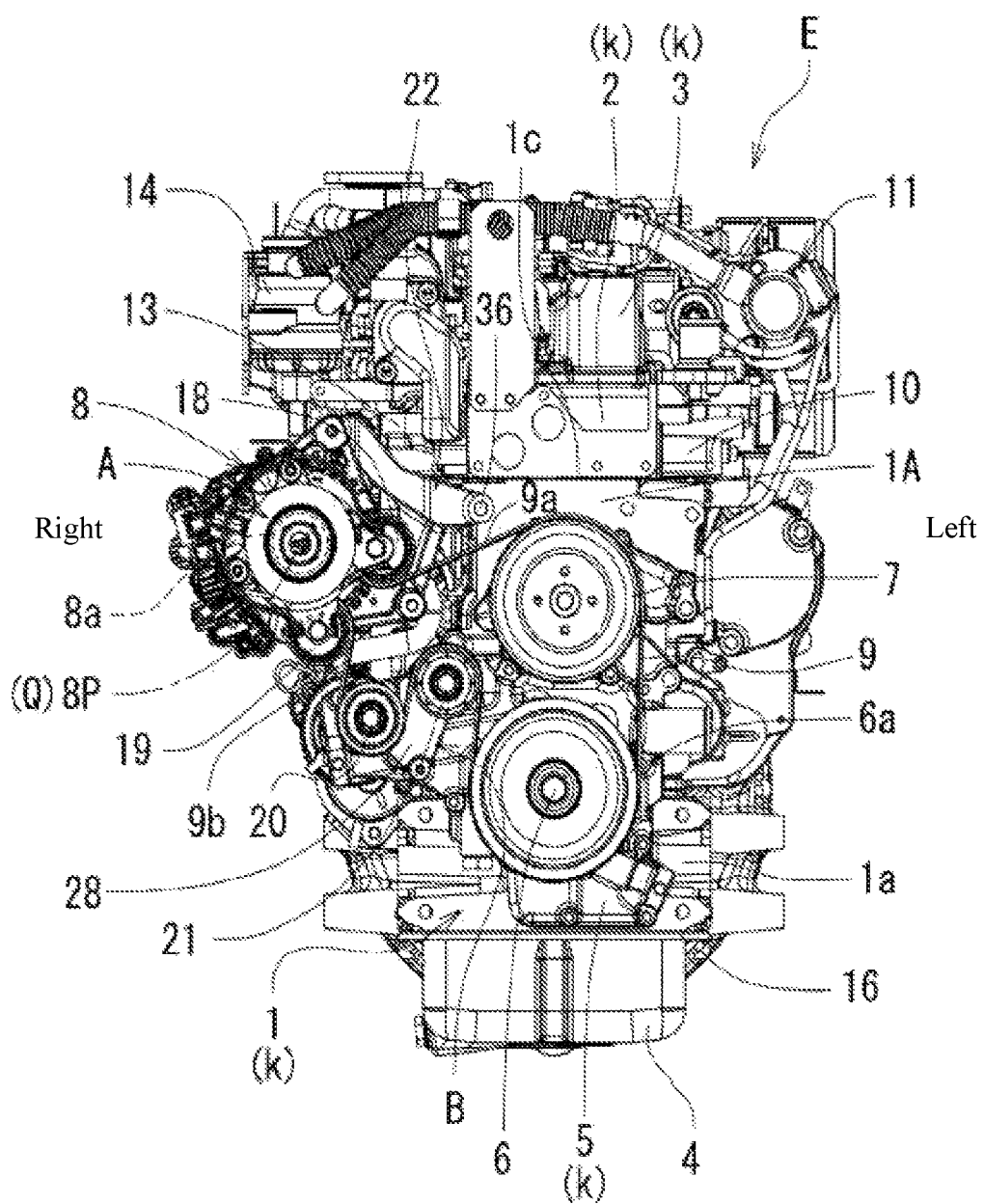
FIG. 7 is a front view of an industrial hybrid diesel engine.
Figure 8:
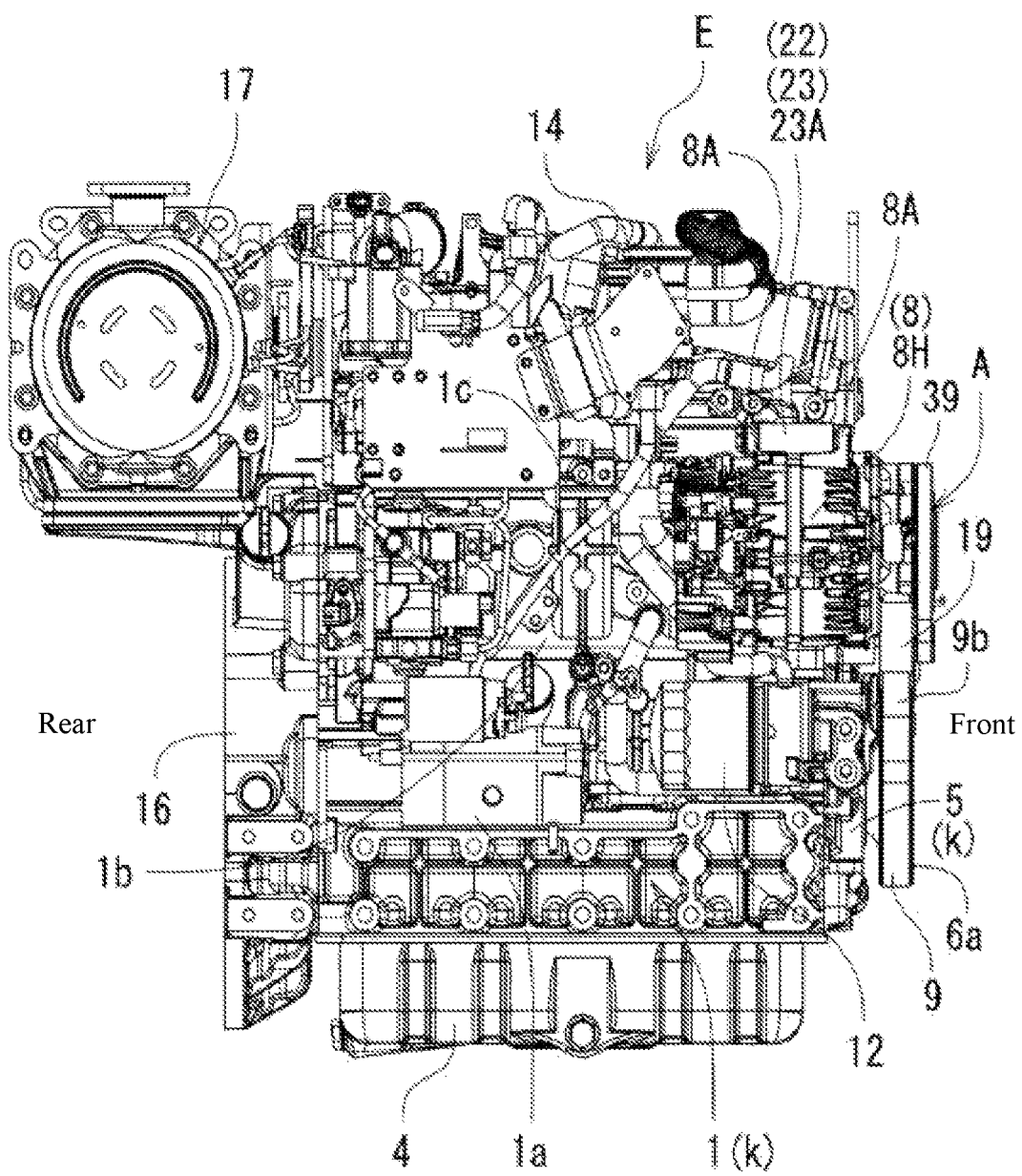
FIG. 8 is a right side view of the engine illustrated in FIG. 7.
Figure 9:
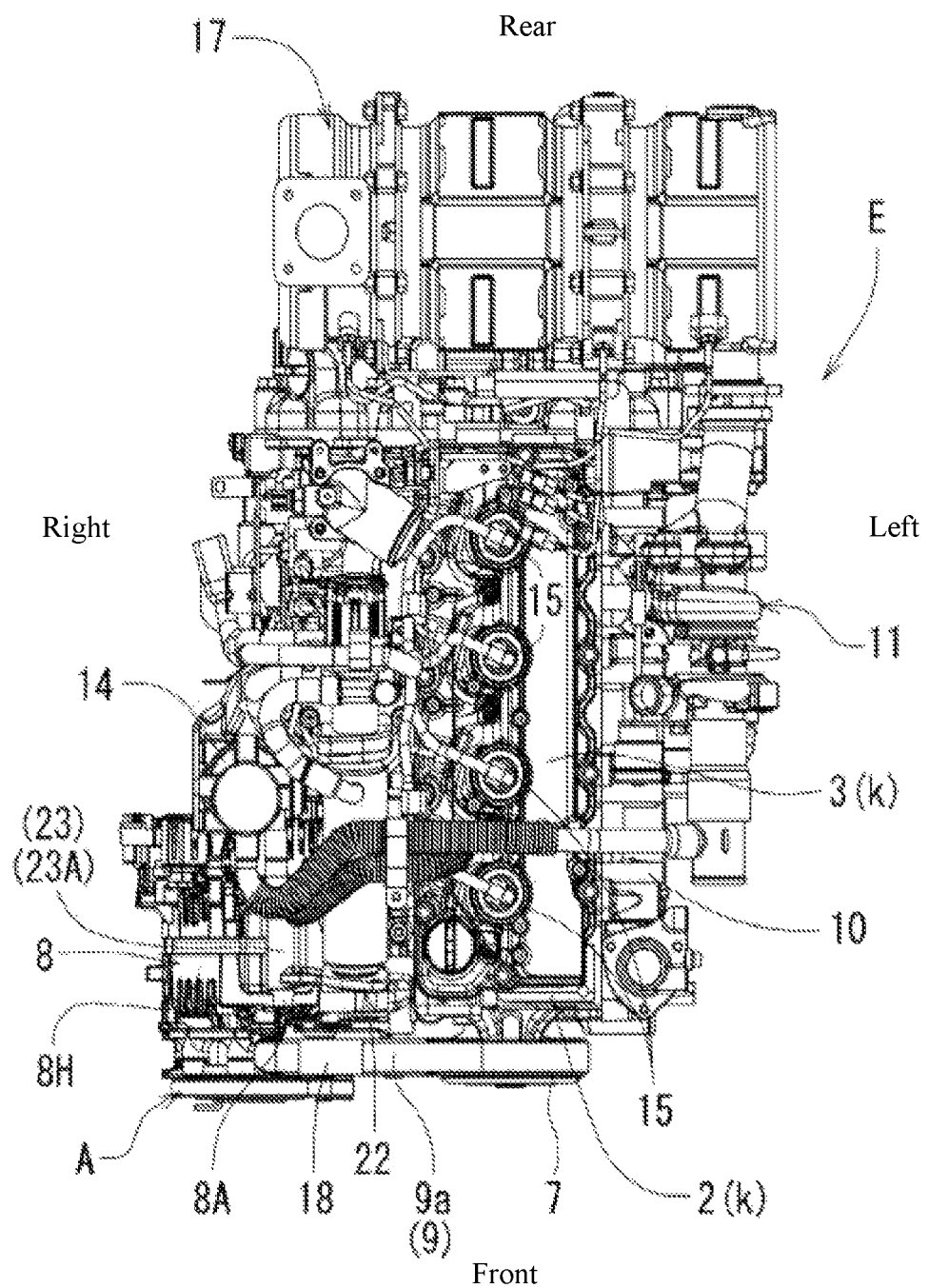
FIG. 9 is a plan view of the engine illustrated in FIG. 7.

As illustrated in FIGS. 7 to 9, in an in-line four-cylinder industrial hybrid diesel engine (hereinafter simply referred to as an engine) E, a cylinder head 2 is assembled on a cylinder block 1, and an oil pan 4 is assembled under the cylinder block 1. The lower portion of the cylinder block 1 is formed as a crankcase 1a, and the upper portion thereof is formed as a cylinder 1b. A head cover (a cylinder head cover) 3 is assembled on the cylinder head 2, and a cover case 5 is assembled in front of the cylinder block 1.

As illustrated in FIGS. 7 to 9, a transmission belt (an example of the endless rotation band) 9 is provided in a front portion of the engine E, extending over a drive pulley 6a of a crankshaft 6, a fan pulley 7 for driving a cooling fan (an example of an auxiliary machine for engines, not illustrated), and a motor pulley 8a of an electric motor 8 that is a motor generator. The left side of the engine E is provided with the exhaust manifold 10, a supercharger (a turbo) 11, and the like. An engine oil filter (an oil filter) 12, the intake manifold 13, the electric motor 8, an oil separator 14 for blow-by gas, and the like are mounted on the right side of the engine E, and four injectors 15 are mounted on an upper side thereof. The flywheel housing 16 and an exhaust device (exhaust aftertreatment device) 17 are provided in a rear portion of the engine E.

Figure 10:
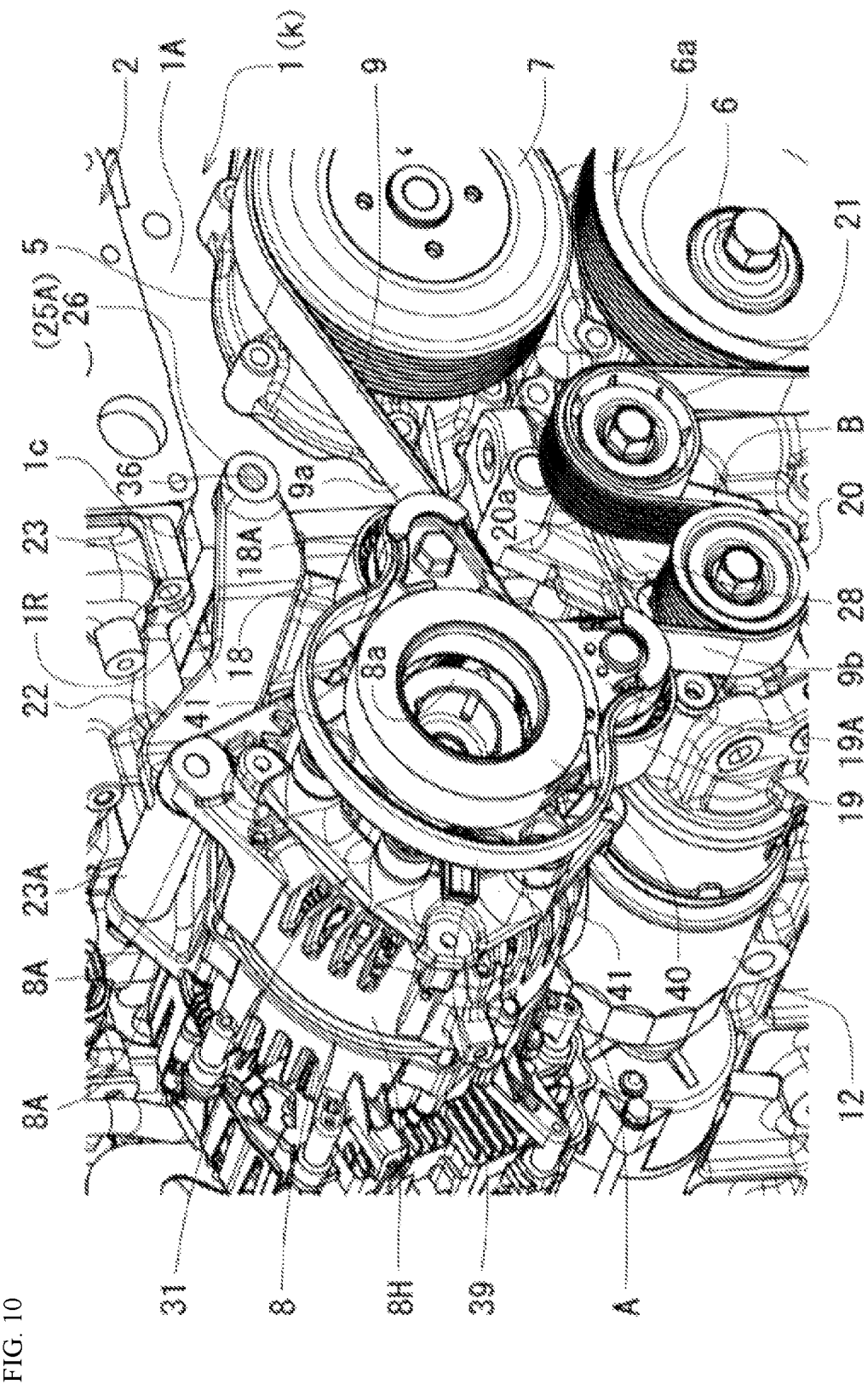
FIG. 10 is an enlarged perspective view of a main part illustrating a support structure of the electric motor and a belt tension mechanism.

As illustrated in FIGS. 7 and 10, a belt tension mechanism (belt tensioner) A is provided at a position immediately in front of the electric motor 8. The belt tension mechanism A includes first and second tension pulleys 18 and 19 that act on both pushing and pulling of the transmission belt 9. Accordingly, the transmission belt is wound around the drive pulley 6a, the fan pulley 7, the first tension pulley 18, the motor pulley 8a, the second tension pulley 19, a first idle pulley 20, and a second idle pulley 21. An idle mechanism B includes the first and second idle pulleys 20 and 21.

As illustrated in FIGS. 7 to 11, the electric motor 8 is disposed on the right side at the upper portion of the cylinder block 1, and is attached to an engine case k in a position-fixed state using one support bracket 22. Note that the engine case k refers to strength members among elements constituting the engine, such as the cylinder block 1, the cylinder head 2, the head cover 3, and the cover case (that may be a transmission case) 5.

As illustrated in FIGS. 1 to 3(A), the support bracket 22 includes first and second support portions 23 and 24 for attaching the electric motor 8, and attachment portions 25 positioned between the first and second support portions 23 and 24 for attaching the electric motor 8 to the engine case k. The attachment portions 25 include a first attachment portion 25A that is bolted to a first case side wall 1A of the engine case k, and a second attachment portion 25B that is bolted to a second case side wall 1R of the engine case k, the second case side wall 1R being different in an orientation from the first case side wall 1A.

Figure 11:
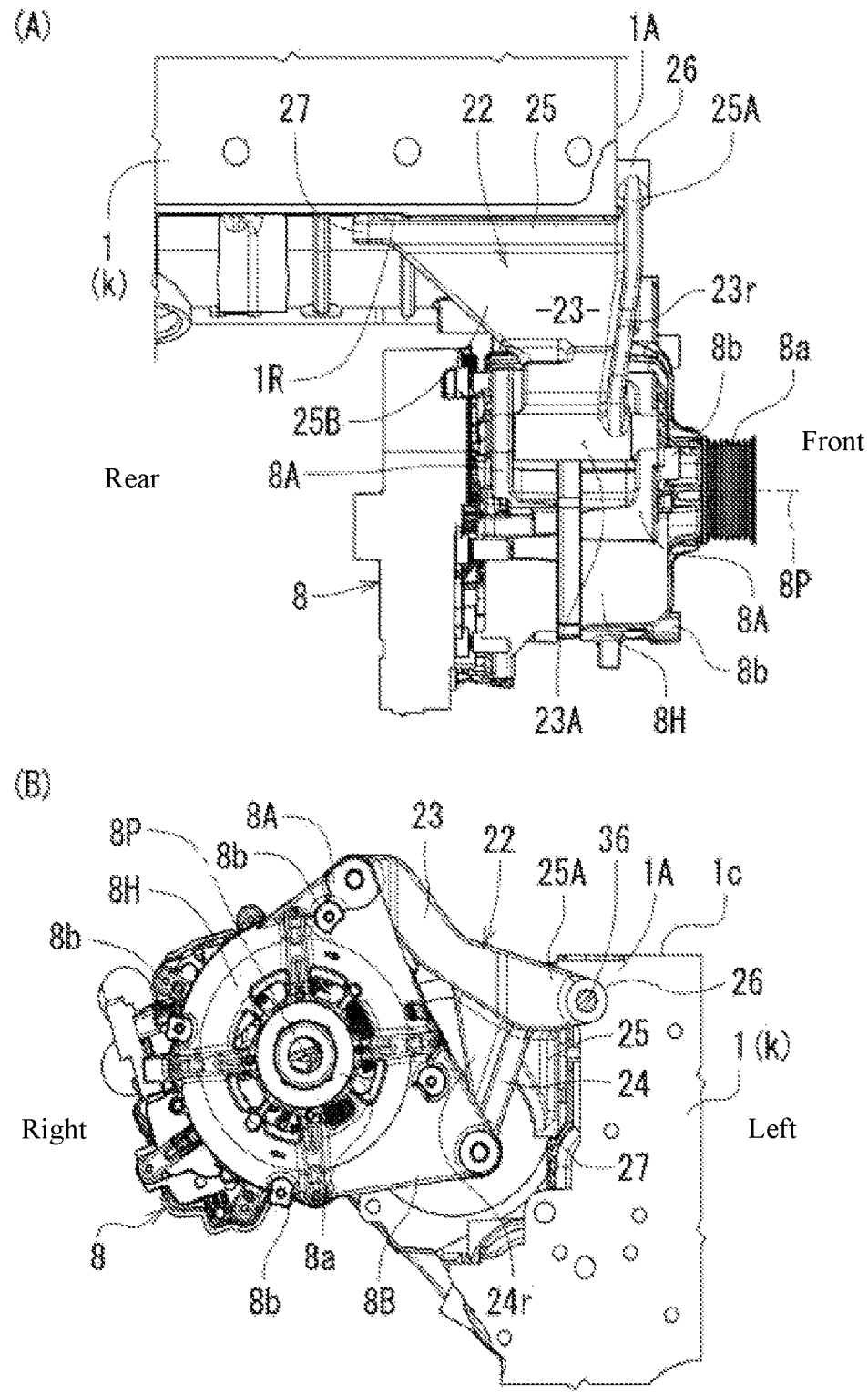
FIGS. 11(A) and 11(B) illustrate an electric motor mounting structure, where

As illustrated in FIGS. 10 and 11, the first case side wall 1A is a front side wall on which the drive pulley is disposed, that is, a front side wall 1A of the cylinder block 1, and the second case side wall 1R is a right side wall (a lateral side wall) 1R of the cylinder block 1 on which the intake manifold 13 is disposed. In other words, the first attachment portion 25A has a first attachment surface 26a having a surface extending rightward, leftward, upward, and downward, and is attached to the front side wall 1A with a bolt extending in a front-rear orientation. The second attachment portion 25B has a second attachment surface 27a having a surface extending forward, backward, upward, and downward, and is attached to the right side wall 1R with a bolt extending in a left-right orientation.

The first attachment portion 25A is bent leftward at a right angle from a front end portion of an attachment main body 25C, and has a boss portion 26 having the first attachment surface 26a that abuts on the front side wall 1A. In the boss portion 26, one mounting hole 26c for bolt insertion and a front seat surface 26b abutting on a flange of a bolt or a washer are formed. The second attachment portion 25B is an arm-shaped portion extending slightly downward on a rear side from the attachment main body 25C, and has an attachment seat 27 having the second attachment surface 27a abutting on the right side wall 1R. In the attachment seat 27, two mounting holes 27c and 27c for bolt insertion, and a pair of upper and lower lateral seat surfaces 27b and 27b formed in a recessed flat surface in a stepped manner so as to be in contact with the flange of the bolt or the washer are formed.

The first support portion 23 protrudes obliquely upward from the attachment portions 25 so as to bolt a pair of front and rear upper projecting pieces 8A formed on the upper portion of a motor housing 8H of the electric motor 8. The first support portion 23 has a boss portion 23A sandwiched between the pair of upper projecting pieces 8A and 8A (the bifurcated upper projecting pieces 8A), and a mounting hole 23a extending in a front-rear orientation is formed in the boss portion 23A for bolt insertion. The second support portion 24 protrudes obliquely downward from the attachment portions 25 so as to bolt a pair of front and rear lower projecting pieces 8B and 8B (the bifurcated lower projecting piece 8B) formed at the lower portion of the motor housing 8H. The second support portion 24 has a boss portion 24A sandwiched between the pair of lower projecting pieces 8B and 8B, and a mounting hole 24a extending in a front-rear orientation is formed in the boss portion 24A for bolt insertion.

Figure 1:
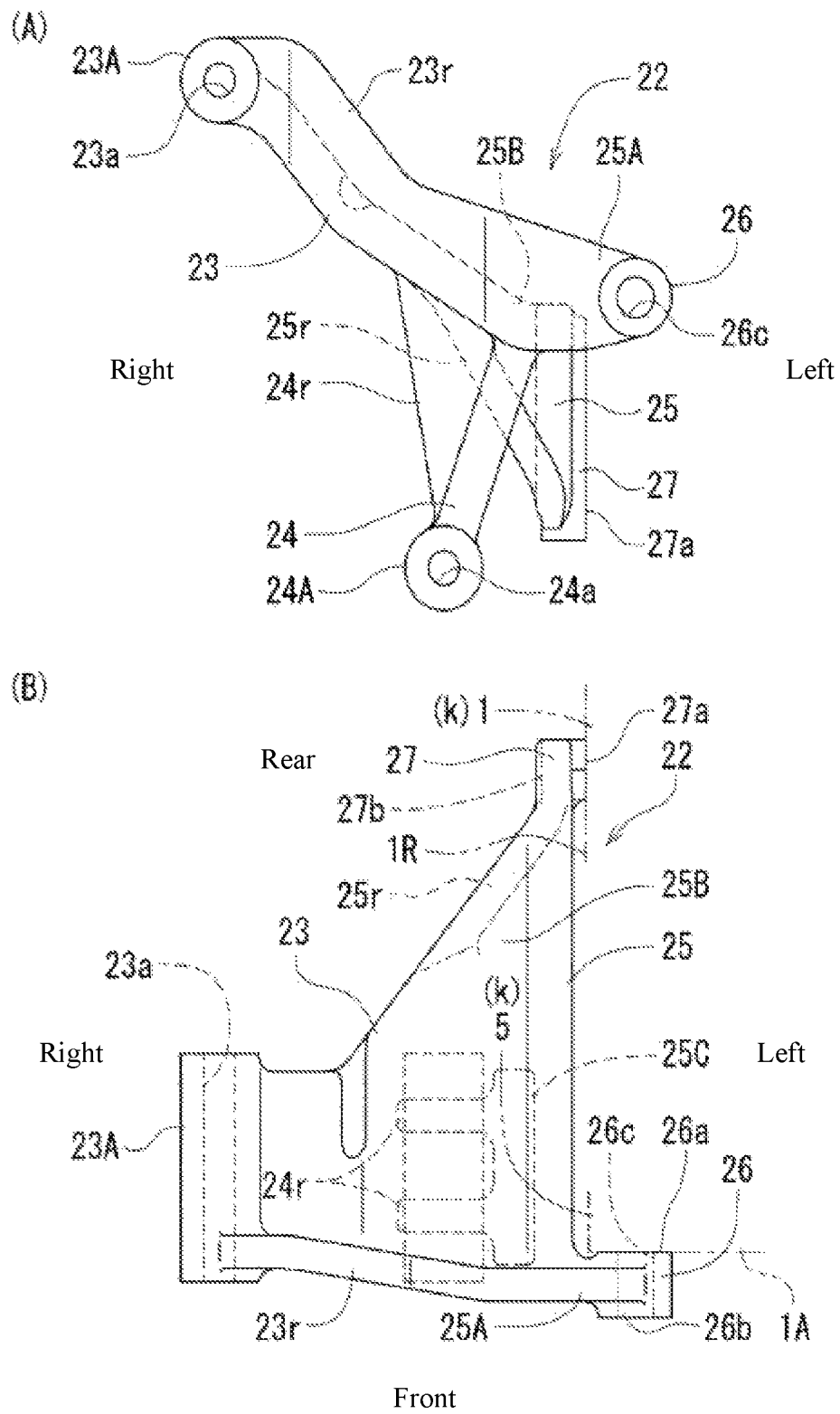
FIGS. 1(A) and 1(B) illustrate a support bracket, where
Figure 2:
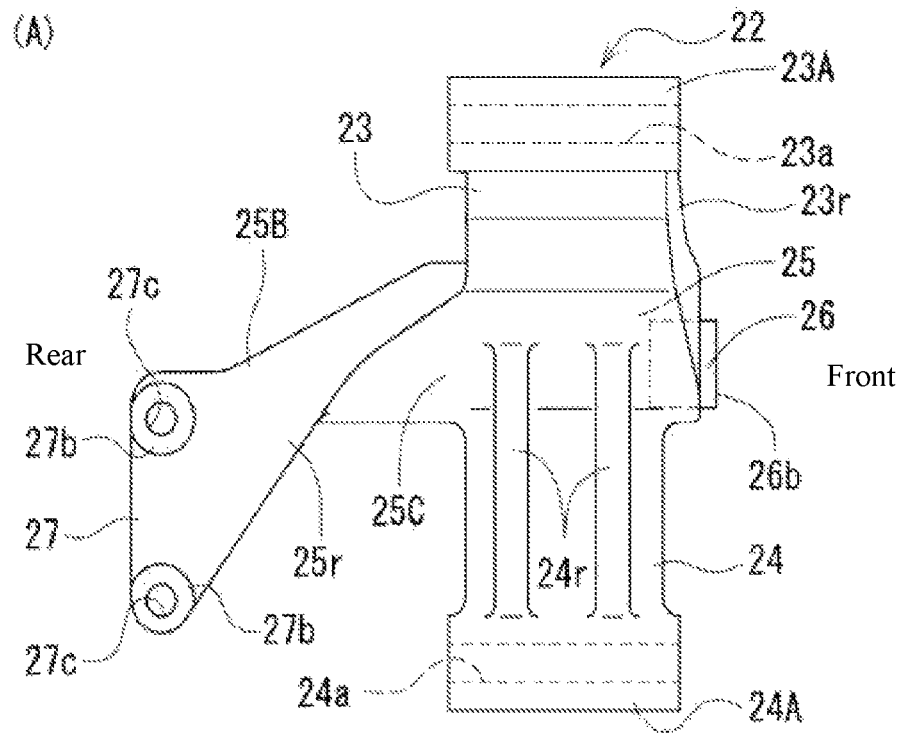
FIGS. 2(A) and 2(B) illustrate the support bracket of FIGS. 1(A) and 1(B), where
Figure 2:
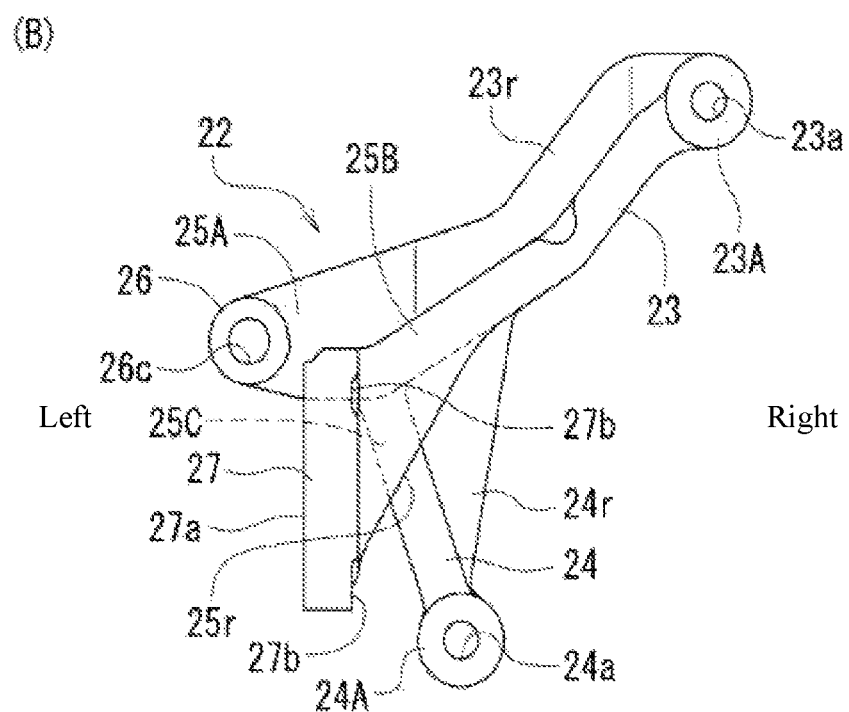
Figure 3:
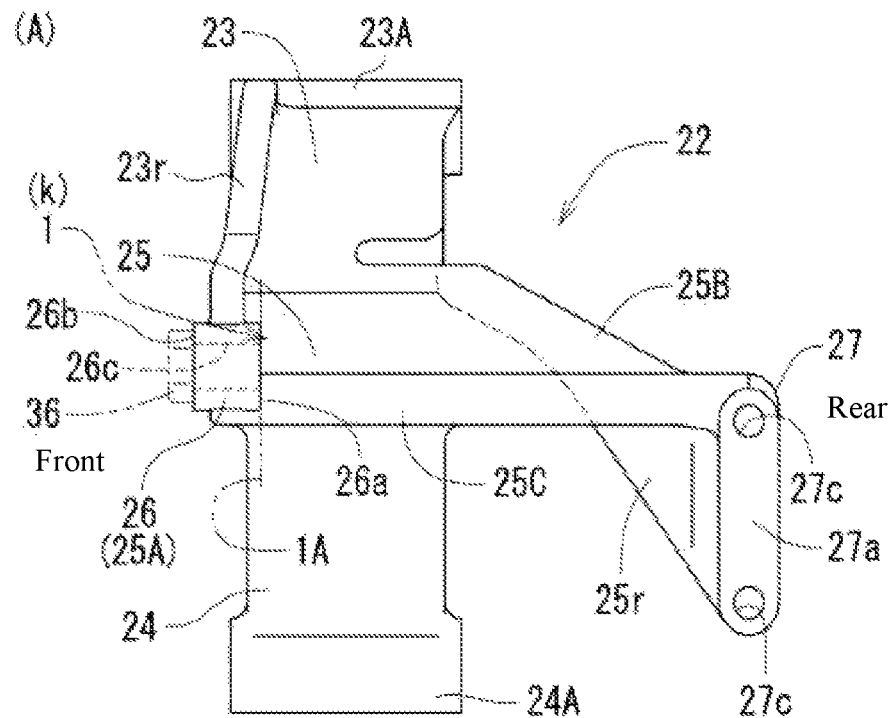
FIG. 3(A) is a left side view of the support bracket of FIGS. 1(A) and 1(B)
FIG. 3(B) is a front view of a tension bracket.
Figure 3:
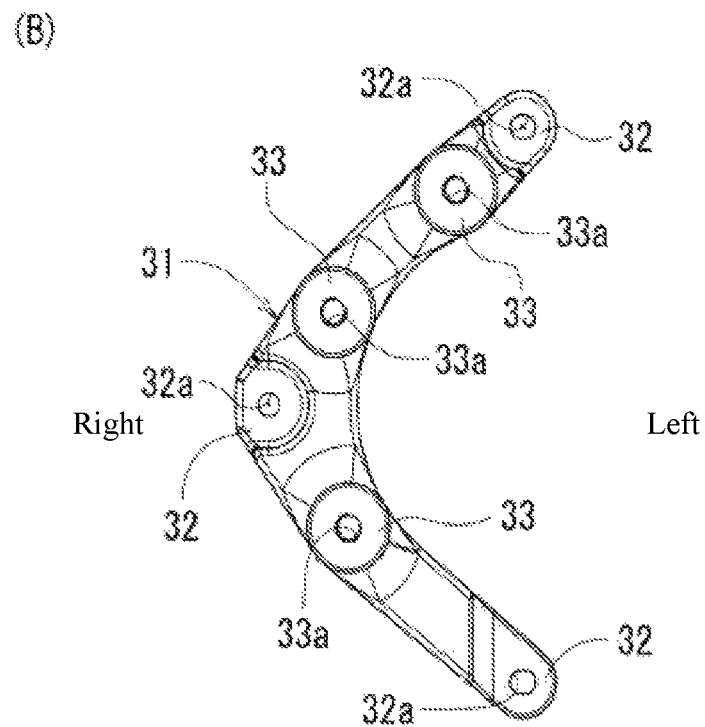

As illustrated in FIGS. 1 and 2, a pair of front and rear reinforcing ribs 24r and 24r having a triangular shape as viewed in a front-rear direction are formed across a root of the first support portion 23, the attachment main body 25C, and the second support portion 24, and a reinforcing rib 23r is formed across the first support portion 23 and the first attachment portion 25A. Furthermore, a reinforcing rib 25r extending from the attachment main body 25C to the second attachment portion 25B is also formed. The support bracket 22 can be made of various materials such as a forged iron, a cast iron, and an aluminum alloy.

As illustrated in FIGS. 7 and 10, the belt tension mechanism (the bidirectional tensioner) A is provided, which is in sliding contact with back surfaces of both transmission belt portions (endless rotation band portions) 9a and 9b of the transmission belt 9 that are pushed and pulled with respect to the motor pulley 8a and acts as a tension. The structure of the belt tension mechanism A itself is known, and the pair of tension pulleys 18 and 19 is elastically urged by a yoke spring 39 in the direction of approaching each other, and the transmission belt 9 with respect to the motor pulley 8a can be suitably tensioned in any rotation direction.

Figure 12:
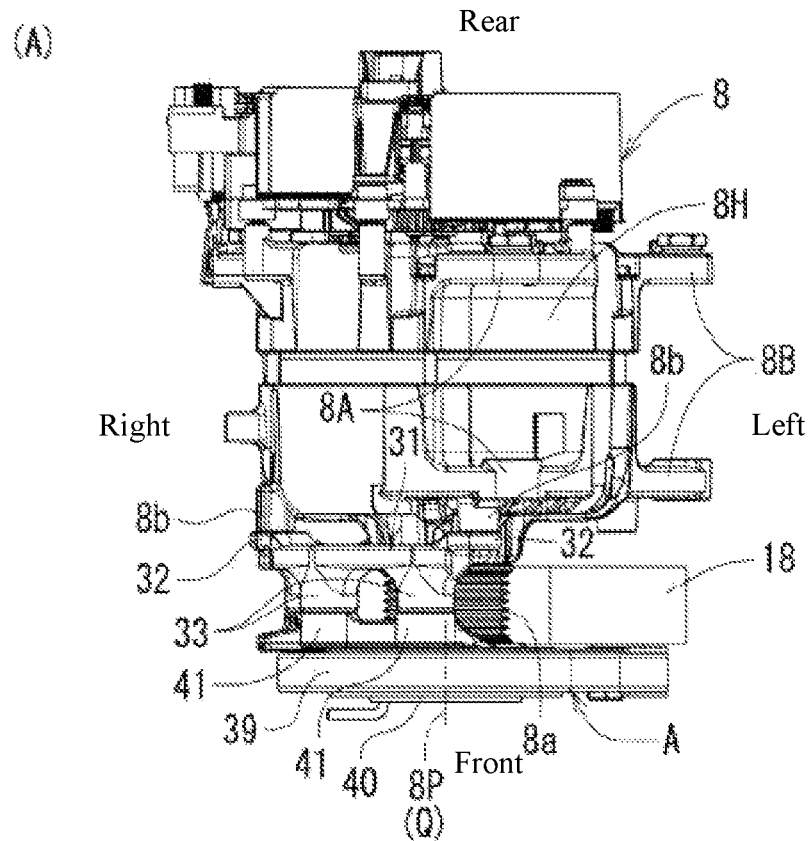
FIGS. 12(A) and 12(B) illustrate an electric motor to which the belt tension mechanism is assembled, where
Figure 12:
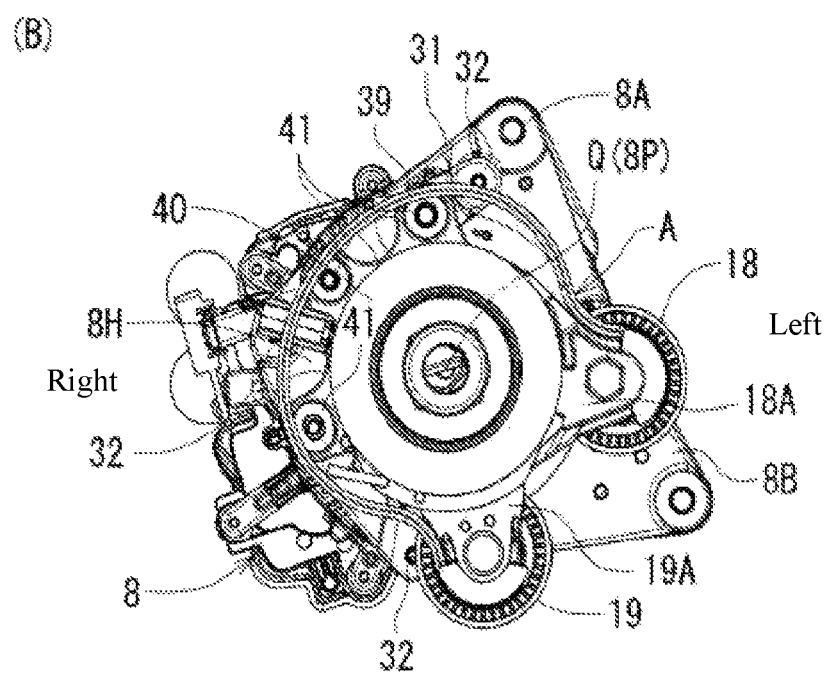

As illustrated in FIGS. 10 and 12, in the belt tension mechanism A, rotary frames 18A and 19A pivotally supporting the tension pulleys 18 and 19 are rotatably supported by an annular tension body 40 about a virtual axis Q. Respective distal end portions of the yoke spring 39 arranged in a state of surrounding an outer periphery side of the tension body 40 are engaged with the respective rotary frames 18A and 19A, and the respective tension pulleys 18 and 19 are elastically biased in a direction of approaching each other by an elastic force of the yoke spring 39 having a C shape. Furthermore, in the tension body 40, tongue pieces 41 for bolting are formed to protrude at three locations.

Figure 4:
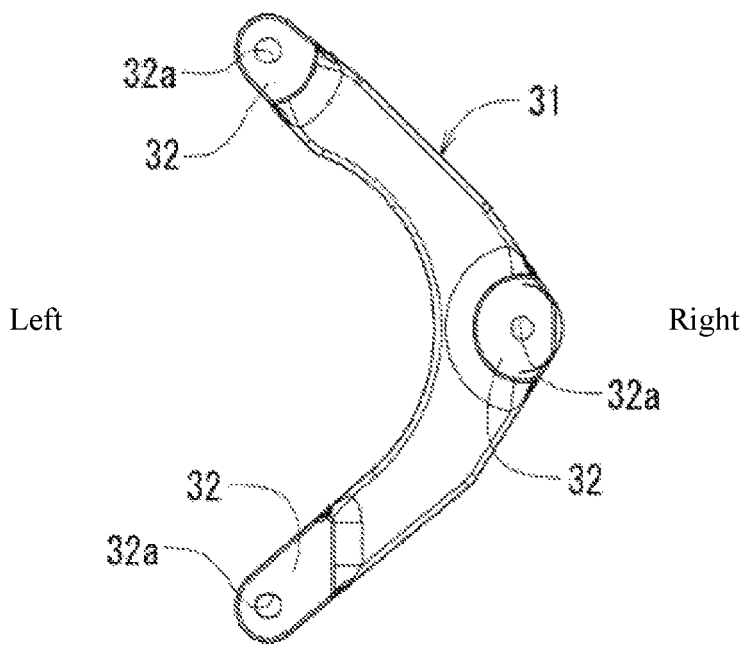
FIGS. 4(A) and 4(B) show the tension bracket of FIG. 3(B), where
Figure 4:
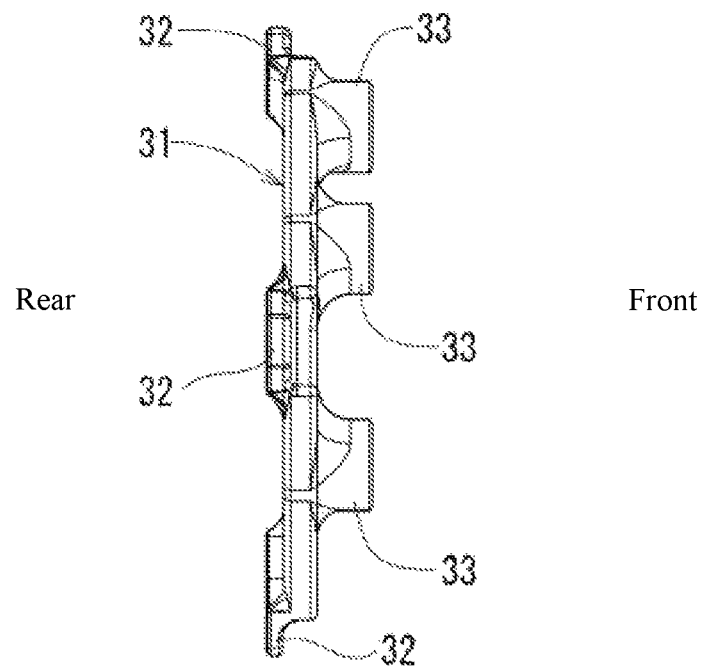

As illustrated in FIGS. 3(B) and 4, the belt tension mechanism A is attached to the motor housing 8H by using a tension bracket 31 having a "chevron" shape. The tension bracket 31 has a total of three attachment seats 32 formed at both end portions and a central portion in a longitudinal direction, and a total of three support bosses 33 at two upper positions and one lower position. A through hole 32a for bolt insertion is formed in each attachment seat 32, and a female screw 33a for bolt screwing is formed in each support boss 33.

In other words, as illustrated in FIGS. 10 and 12, the belt tension mechanism A is bolted to the tension bracket 31 by the three support bosses 33, and the tension bracket 31 is bolted to three screw seats 8b formed on a front surface side of the motor housing 8H by the three attachment seats 32. Furthermore, although the virtual axis Q of the belt tension mechanism A and a motor axis center 8P coincide with each other [see FIG. 12(B)], the virtual axis Q of the belt tension mechanism A and the motor axis center 8P may be displaced from each other.

Figure 5:
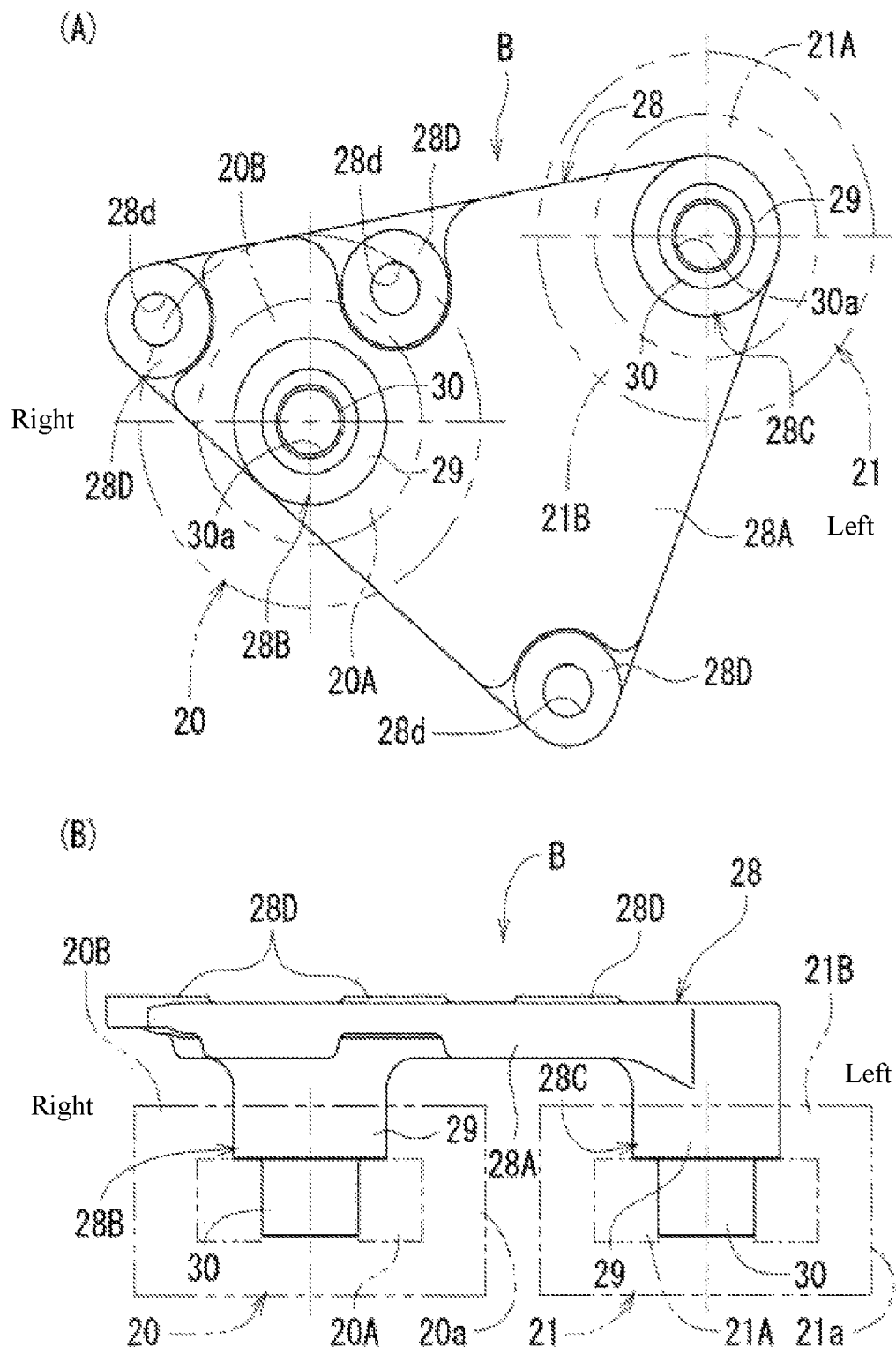
FIGS. 5(A) and 5(B) illustrate an idler bracket, where
Figure 6:
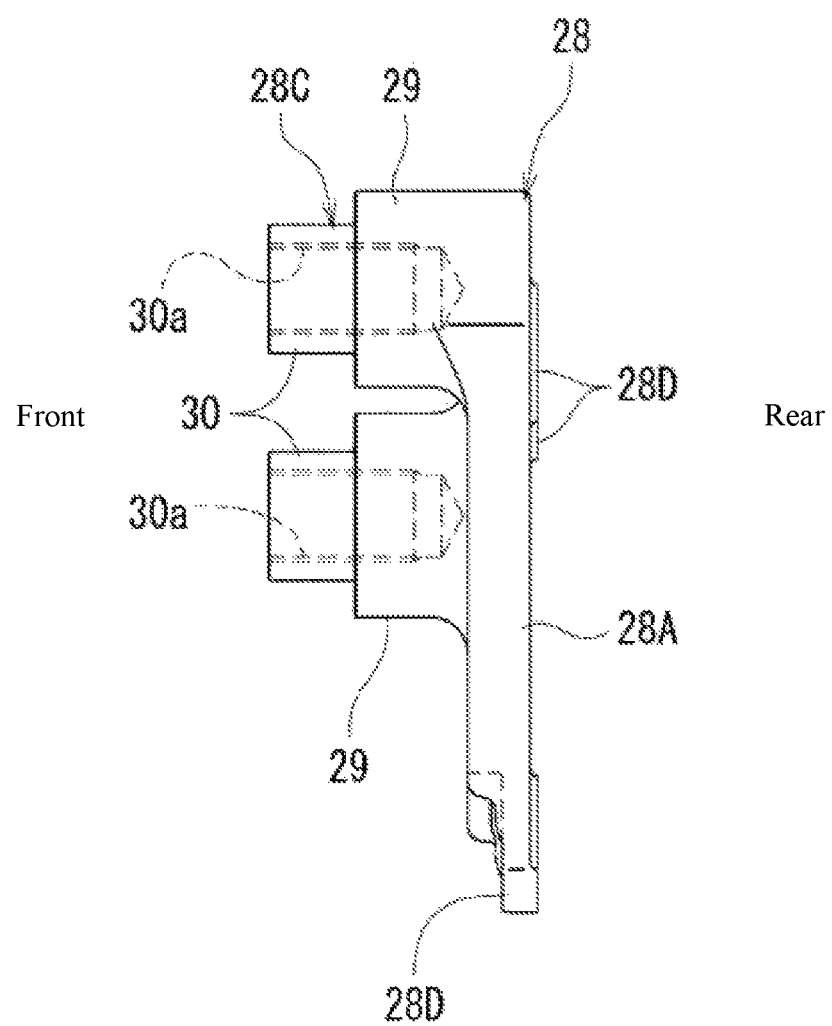
FIG. 6 is a left side view of the idler bracket illustrated in FIGS. 5(A) and 5(B).

As illustrated in FIGS. 5 and 6, the idle mechanism B is configured by pivotally supporting the first idle pulley 20 and the second idle pulley 21 on an idler bracket 28. The first idle pulley 20 is a pulley around which a toothed abdominal surface (an inner peripheral surface) of the transmission belt 9 is wound, and a plurality of peripheral grooves 20a (see FIG. 10), which are engaged with a plurality of protruding stripes (reference signs are omitted) of the transmission belt 9, are formed on the outer periphery of a pulley body 20B side by side in the rotation axis direction (reference sign is omitted). The second idle pulley 21 is a pulley around which the back surface (the outer periphery surface) of the transmission belt is wound, and includes a flat outer periphery surface 21a having no unevenness in a direction of the rotation axis (reference sign is omitted) on a pulley body 21B.

In the idler bracket 28, a plate-like support main body 28A, two support boss portions 28B and 28C for supporting the pulleys, and three fastening seats 28D for bolting are formed. The support boss portions 28B and 28C have the same structure and include a boss base portion 29 rising from the support main body 28A and a support shaft portion 30 protruding from the boss base portion 29. A nut portion 30a is bored in each support shaft portion 30. A mounting hole 28d for bolt insertion is formed in each fastening seat 28D.

As illustrated in FIGS. 5(A) and 5(B), in both the first and second idle pulleys 20 and 21, bearings 20A and 21A such as ball bearings are fitted and attached (press-fitted or the like) to the pulley bodies 20B and 21B, and the bearings 20A and 21A are fitted and attached to the idler bracket 28 in a rotatable manner by externally fitting the bearings to the support shaft portions 30. The first idle pulley 20 is bolted to the support shaft portion 30 of the first support boss portion 28B of the left side using the nut portion 30a, and the second idle pulley 21 is bolted to the support shaft portion 30 of the second support boss portion 28C of the right side using the nut portion 30a.

The transmission belt 9 is wound around the first idle pulley 20 from below and the second idle pulley 21 from above. Accordingly, the pair of idle pulleys 20 and 21 is arranged such that an appropriate belt winding angle of the belt tension mechanism A and a sufficient winding angle of the drive pulley 6a can be obtained by the idle mechanism B.

Figure 13:
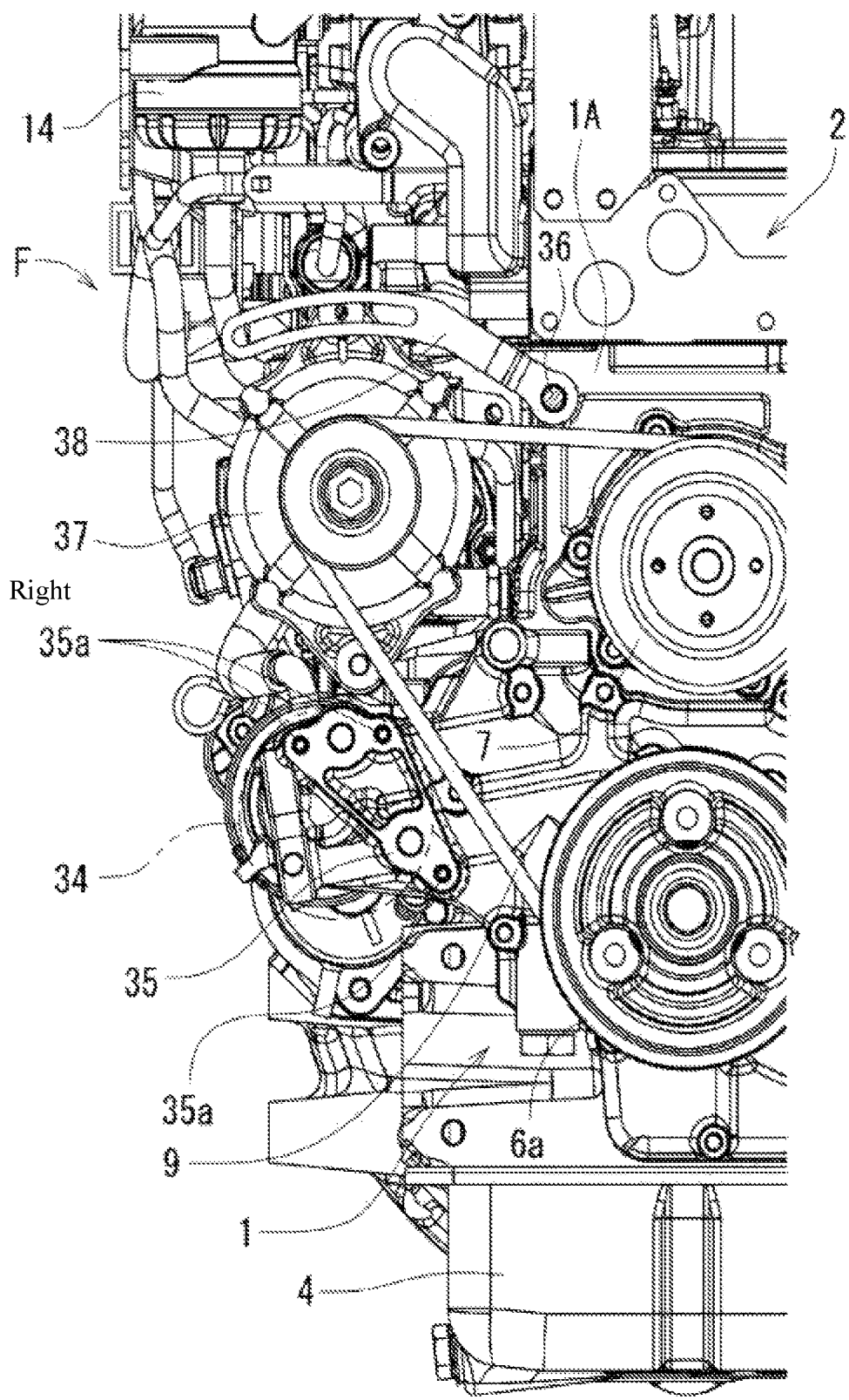
FIG. 13 is a front view illustrating a main part of an engine with different specifications.

The idler bracket 28 is attached using screwing portions 35a (see FIG. 13) for attaching an auxiliary machine 34 in an engine F having different specifications. In other words, as illustrated in FIG. 13, a supporting case portion 35 to which the idler bracket 28 is bolted is originally a structural portion for providing a filter front portion arrangement structure in which an oil filter (an example of the auxiliary machine) 34 in the engine F with different specifications is bolted to a front side thereof. In the (hybrid) engine of the present specification, the filter front portion arrangement structure is not adopted, and the front side of the supporting case portion 35 described above is empty. Therefore, the supporting case portion 35 is effectively used as an attachment portion for bolting the idler bracket 28 using the three screwing portions 35a.

In other words, when making the engines E and F with a plurality of specifications, the supporting case portion 35 and the screwing portions 35a thereof provided for the engine F of certain specifications are designed and devised so as to be able to function as an attachment means of the idler bracket 28 in the engine E with specifications different from the certain specifications mentioned. Accordingly, since it is not necessary to newly provide a dedicated means for attaching the idler bracket 28 by the design ingenuity, there is an effect that reductions in the number of machining steps and cost can be achieved and rationalization is promoted as a result.

As illustrated in FIGS. 3(A) and 7, a bolt 36 [attached to a female screw portion (not illustrated) of the front side wall 1A] for fixing the first attachment portion 25A of the support bracket 22 is shared as a bolt 36 for screwing a dynamo stay 38 with a long hole for supporting the upper portion of a dynamo (an alternator) 37 in a position operation variable manner in the engine F with different specifications as illustrated in FIG. 13. Accordingly, the structure of the cover case 5 and the like is designed by devising such that the first attachment portion 25A or the dynamo stay 38 can be attached with the same bolt 36 (to be precise, the female screw portion of the front side wall 1A).

As illustrated in FIGS. 7 and 11, the position of the axis center 8P of the electric motor 8 is set at a height lower than an upper end 1c of the cylinder block 1 and lower than the oil separator 14. The electric motor 8 is disposed so as to project relatively largely rightward with respect to the cylinder block 1, and the position thereof in the left-right direction with respect to the engine E is substantially the same as or the same as the position of the oil separator 14 disposed behind the electric motor 8.

As described above, in the engine E, the heavy electric motor 8 can be fixed and supported with sufficient strength even at a position relatively away to a right side of the engine E by the support bracket 22 that is bolted and fixed to the right side wall 1R and the front side wall 1A of the cylinder block 1 and supports the upper portion and the lower portion of the motor housing 8H.

Since a screwing means (the female screw portion of the front side wall 1A) of the bolt 36 for attaching the first attachment portion 25A has a structure in which the dynamo stay 38 of the current engine (the engine F with different specifications) can be bolted (see FIG. 13), the industrial hybrid engine E can be compatibly realized based on the current engine.

Since the belt tension mechanism A is disposed on the front surface side of the electric motor 8, it is not necessary to provide a space for providing the belt tension mechanism A between the electric motor 8 and the cylinder block 1. Therefore, the electric motor 8 can be brought close to the cylinder block 1 as much as possible in a lateral direction, and a compact engine layout can be realized. Since the motor housing 8H and the belt tension mechanism A are connected by using the tension bracket 31, a change of the tension bracket 31 makes it easy to arbitrarily change a phase and position of the belt tension mechanism A, and there is a convenient and flexible advantage that it is possible to cope with specifications having different pulley ratios.

Another Embodiment

The support bracket 22 can be subjected to various structural changes such as a configuration in which the support bracket is bolted to the right side wall 1R of the cylinder block 1 and the front side wall (reference sign is omitted) of the cover case 5 at two positions, or a configuration in which the attachment portions 25 exist at two positions on the upper side of the first support portion 23 and the lower side of the second support portion 24 and are bolted to the engine case k.

DESCRIPTION OF REFERENCE SIGNS

1: Cylinder block
1A: First case side wall (front side wall)
1R: Second case side wall (lateral side wall)
1c: Upper end (cylinder head)
6: Crankshaft
6a: Drive pulley
8: Electric motor
8P: Axis center
8a: Motor pulley
9: Endless rotation band
9a, 9b: Endless rotation band portion
13: Intake manifold
20, 21: Idle pulley
22: Support bracket
23: First support portion
24: Second support portion
25: Attachment portion
25A: First attachment portion
25B: Second attachment portion
28: Idler bracket
31: Tension bracket
34: Auxiliary machine (oil filter)
35a: Screwing portion A: Tensioner (belt tension mechanism)
F: Engine with different specifications
k: Engine case

The invention claimed is:

1. An industrial hybrid engine provided with an endless rotation band wound around a drive pulley of a crankshaft and a motor pulley of an electric motor for motive power, wherein the electric motor is attached to an engine case in a position-fixed state using one support bracket, the support bracket including first and second support portions for attaching the electric motor, and an attachment portion positioned between the first and second support portions for attaching the electric motor to the engine case, the first support portion protruding obliquely upward from the attachment portion to bolt an upper portion of the electric motor, and the second support portion protrudes obliquely downward from the attachment portion to bolt a lower portion of the electric motor.

2. The industrial hybrid engine according to claim 1, wherein the attachment portion includes a first attachment portion that is bolted to a first case side wall of the engine case, and a second attachment portion that is bolted to a second case side wall of the engine case, the second case side wall being different in an orientation from the first case side wall.

3. The industrial hybrid engine according to claim 2, wherein a bidirectional tensioner that acts as tension on each endless rotation band portion that is pushed and pulled with respect to the motor pulley in the endless rotation band is provided, and the tensioner is attached to a tension bracket supported by the electric motor.

4. The industrial hybrid engine according to claim 1, wherein the first case side wall is a front side wall on which the drive pulley is disposed, and the second case side wall is a lateral side wall on which an intake manifold is disposed.

5. The industrial hybrid engine according to claim 4, wherein a bidirectional tensioner that acts as tension on each endless rotation band portion that is pushed and pulled with respect to the motor pulley in the endless rotation band is provided, and the tensioner is attached to a tension bracket supported by the electric motor.

6. The industrial hybrid engine according to claim 4, wherein the engine case is a cylinder block, the front side wall is a front side wall of the cylinder block, and the lateral side wall is a lateral side wall of the cylinder block.

7. The industrial hybrid engine according to claim 6, wherein a bidirectional tensioner that acts as tension on each endless rotation band portion that is pushed and pulled with respect to the motor pulley in the endless rotation band is provided, and the tensioner is attached to a tension bracket supported by the electric motor.

8. The industrial hybrid engine according to claim 6, wherein a position of an axis center of the electric motor is set at a height lower than an upper end of the cylinder block.

9. The industrial hybrid engine according to claim 8, wherein a bidirectional tensioner that acts as tension on each endless rotation band portion that is pushed and pulled with respect to the motor pulley in the endless rotation band is provided, and the tensioner is attached to a tension bracket supported by the electric motor.

10. The industrial hybrid engine according to claim 1, wherein a bidirectional tensioner that acts as tension on each endless rotation band portion that is pushed and pulled with respect to the motor pulley in the endless rotation band is provided, and the tensioner is attached to a tension bracket supported by the electric motor.

11. The industrial hybrid engine according to claim 10, wherein an idler pulley around which the endless rotation band is wound is provided between the drive pulley and the motor pulley, and an idler bracket pivotally supporting the idler pulley is attached using a screwing portion for attaching an auxiliary machine in an engine with a different specification.

12. An industrial hybrid engine provided with an endless rotation band wound around a drive pulley of a crankshaft and a motor pulley of an electric motor for motive power, wherein the electric motor is attached to an engine case in a position-fixed state using one support bracket, the support bracket including first and second support portions for attaching the electric motor, and an attachment portion positioned between the first and second support portions for attaching the electric motor to the engine case, the attachment portion including a first attachment portion that is bolted to a first case side wall of the engine case, and a second attachment portion that is bolted to a second case side wall of the engine case, the second case side wall being different in an orientation from the first case side wall.

13. The industrial hybrid engine according to claim 12, wherein a bidirectional tensioner that acts as tension on each endless rotation band portion that is pushed and pulled with respect to the motor pulley in the endless rotation band is provided, and the tensioner is attached to a tension bracket supported by the electric motor.

14. An industrial hybrid engine provided with an endless rotation band wound around a drive pulley of a crankshaft and a motor pulley of an electric motor for motive power, wherein the electric motor is attached to an engine case in a position-fixed state using one support bracket;

a bidirectional tensioner that acts as tension on each endless rotation band portion that is pushed and pulled with respect to the motor pulley in the endless rotation band is provided, and the tensioner is attached to a tension bracket supported by the electric motor; and an idler pulley around which the endless rotation band is wound is provided between the drive pulley and the motor pulley, and an idler bracket pivotally supporting the idler pulley is attached using a screwing portion for attaching an auxiliary machine in an engine with a different specification.

15. The industrial hybrid engine according to claim 14, wherein the auxiliary machine is an oil filter.

16. An industrial hybrid engine provided with an endless rotation band wound around a drive pulley of a crankshaft and a motor pulley of an electric motor for motive power, wherein the electric motor is attached to an engine case in a position-fixed state using one support bracket, the support bracket including first and second support portions for attaching the electric motor, and an attachment portion positioned between the first and second support portions for attaching the electric motor to the engine case;

a bidirectional tensioner that acts as tension on each endless rotation band portion that is pushed and pulled with respect to the motor pulley in the endless rotation band is provided, and the tensioner is attached to a tension bracket supported by the electric motor; and an idler pulley around which the endless rotation band is wound is provided between the drive pulley and the motor pulley, and an idler bracket pivotally supporting the idler pulley is attached using a screwing portion for attaching an auxiliary machine in an engine with a different specification.

\* \* \* \* \*